United States Patent [19]

Dobreski et al.

[11] Patent Number: 4,814,385

[45] Date of Patent: Mar. 21, 1989

[54] FILMS OF BLENDS OF LINEAR ETHYLENE POLYMERS AND ACRYLONITRILE POLYMERS AND COPOLYMERS

[75] Inventors: David V. Dobreski, Fairport; Jack J. Donaldson, Rochester, both of N.Y.

[73] Assignee: Mobil Oil Corporation, New York, N.Y.

[21] Appl. No.: 107,324

[22] Filed: Oct. 9, 1987

[51] Int. Cl.$^4$ .................. C08L 23/08; C08L 23/18; C08L 35/04

[52] U.S. Cl. .................. 525/238; 525/230; 525/233; 525/96

[58] Field of Search .................. 525/238, 230, 233

[56] References Cited

U.S. PATENT DOCUMENTS

| | | | |
|---|---|---|---|
| 3,065,190 | 11/1962 | Chisholm et al. | 525/238 |
| 3,173,163 | 3/1965 | Cramton | 525/238 |
| 3,299,185 | 1/1967 | Kyoto et al. | 525/238 |
| 3,903,203 | 9/1975 | Trieschmann et al. | 525/238 |
| 3,993,718 | 11/1976 | Bontinck et al. | 525/931 |
| 4,076,698 | 2/1978 | Anderson et al. | |
| 4,156,703 | 5/1979 | Harrop. | |
| 4,299,931 | 11/1981 | Coran et al. | 525/194 |
| 4,555,546 | 11/1985 | Patel | 525/193 |
| 4,579,912 | 4/1986 | Canterino et al. | |
| 4,591,615 | 5/1986 | Aldred et al. | 525/230 |
| 4,690,976 | 9/1987 | Hahnfeld | 525/931 |
| 4,725,637 | 2/1988 | Fernyhough et al. | 525/233 |

FOREIGN PATENT DOCUMENTS 598087  5/1960  Canada .................. 525/238

OTHER PUBLICATIONS

Kaufman et al. "Intro. Poly. Sci. & Tech. SPE Textbook" 10/87 pp. 573-576.

Primary Examiner—Carman J. Seccuro
Attorney, Agent, or Firm—Alexander J. McKillop; Charles J. Speciale

[57] ABSTRACT

The present invention relates to a film comprising a low density linear ethylene copolymer of ethylene and a higher olefin and up to about 10 percent by weight of the total composition of an acrylonitrile homopolymer or copolymer.

11 Claims, No Drawings

FILMS OF BLENDS OF LINEAR ETHYLENE POLYMERS AND ACRYLONITRILE POLYMERS AND COPOLYMERS

CROSS-REFERENCE TO RELATED APPLICATIONS

This application is related to concurrently filed commonly assigned, copending application Ser. No. 107,125, filed 10/9/87.

BACKGROUND OF THE INVENTION

This invention relates to films and more particularly to films such as blown films, cast films and the like prepared from linear ethylene polymers and small amounts of acrylonitrile homopolymers or acrylonitrile copolymers.

Linear low and medium density polyethylene copolymers (LLDPE), and linear high density polyethylene are known materials which are widely commercially available. LLDPE is also described in U.S. Pat. No. 4,076,698 which is incorporated herein by reference. A commercially important use of LLDPE is in films which are conventionally prepared by blown film extrusion. Such films have generally good properties but often exhibit undesirably low stiffness for some uses and having marginal MD tear characteristics.

In accordance with U.S. Pat. No. 4,579,912, MD tear can be improved by blending LLDPE with aromatic polymers such as polystyrene or poly(para-methylstyrene). Furthermore, the stiffness of LLDPE is improved without loss of MD tear.

The present invention also relates to improved LLDPE blends and method for preparing improved films, preferably blown films, made therefrom.

SUMMARY OF THE INVENTION

In one aspect, this invention relates to films comprising blends comprised of from about 90 to about 99 weight percent of low density linear ethylene polymers and small amounts, for example, from about 1 to about 10 weight percent, preferably from about 3 to about 5 weight percent, of an acrylonitrile homopolymer or acrylonitrile copolymer derived from acrylonitrile and one or more monomers selected from the group consisting of a vinyl monomer, a conjugated diene, a 1-olefin and an acrylic compound having the formula

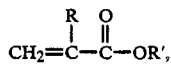

wherein R is selected from the group consisting of hydrogen, methyl and ethyl and R' is alkyl from 1 to about 8 carbon atoms.

In another embodiment of the present invention, a method of improving the MD (machine direction) tear strength and other physical properties of blown films prepared from linear ethylene polymer is provided by adding the hereinabove-identified acrylonitrile polymer to said low density linear ethylene polymers.

DETAILED DESCRIPTION OF THE INVENTION

In accordance with this invention, the MD (machine direction tear strength of ethylene polymers, particularly LLDPE can be improved or, as is often desirable, the same MD tear strength can be obtained in a film of greater stiffness (see Secant modulus). This is accomplished by blending from about 1 to about 10 weight percent, preferably up to about 5 weight percent, and most preferably between about 3 and about 5 weight percent based on the total composition, of an amorphous acrylonitrile homopolymer or copolymer, such as poly(acrylonitrile), acrylonitrile-styrene copolymer, acrylonitrile-methylacrylate copolymer, acrylonitrile-butadiene-styrene terpolymer and the like.

The ethylene polymers which are suitable for use in this invention are those generally prepared by low pressure techniques. Many such polymers are commercially available. Particularly suitable are LLDPE resins which are copolymers of ethylene and higher olefins, particularly 1-butene, 1-hexene, and 1-octene. These LLDPE copolymers generally have a density of between 0.80 and 0.94 g/cc, preferably between 0.91 and 0.93 g/cc.

Preferably, the acrylonitrile polymer, which is blended with the LLDPE in the practice of the present invention, is selected so that its melt viscosity is less than the melt viscosity of the ethylene resin used. The disparity in viscosity appears to contribute to better Elmendorf tear strength of the blends. Also, the best tear strength is obtained with blends in which the LLDPE itself has good tear properties. Such blends result in films with good tear and impact properties, and the higher modulus characteristic of higher density LLDPE film.

Generally, any acrylonitrile homopolymer or copolymer may be used for the purposes herein. However, those having a melt flow rate of about 1 to about 15 g/10 min. are generally preferred, while those having a melt flow rate of about 3 to about 10 g/10 min., as measured by, for example, ASTM 1238 condition I, are most preferred. Illustrative of acrylonitrile homopolymers and copolymers which are useful herein are those derived from acrylonitrile and acrylonitrile and one or more monomers selected from the group consisting of a vinyl monomer, such as styrene, a conjugated diene, such as 1,3-butadiene, a 1-olefin such as ethylene, 1-propylene, etc., and an acrylic compound such as acrylic acid, methyacrylic acid, esters thereof, such as methyl acrylate, ethyl acrylate, butyl acrylate, methyl methacrylate, butyl methacrylate and the like.

For purposes of the present invention, acrylontrile-styrene and acrylonitrile methylacrylate copolymers are preferred.

Compatibilizers can be used in small amounts up to about 2 weight percent of the composition. Suitable compatibilizers include block copolymers of styrene-ethylene propylene-styrene (Kraton G), block copolymers of styrene and ethylene (Shelvis), ethylene propylene copolymers (Vistalon 3707) and ethylene-methyl acrylate copolymer.

The resin blends and films are made in the conventional manner. Preferably, films are made by blown film extrusion using conventional techniques to obtain films which are generally from about 0.5 to 5 mils in thickness.

The following non-limiting examples are illustrative of this invention. Unless otherwise noted all parts are by weight.

EXAMPLES 1–4

Dry blends of linear low density copolymer (LLDPE) with styrene-acrylonitrile copolymer or acrylonitrile-methylacrylate copolymer were dry blended at the extruder hopper. Blown films having a 0.75 mil gauge were produced in a conventional manner at 2.5:1 BUR, at about 90 lbs/hr. output at a melt temp. of 450° F. The films were tested using standard industrial ASTM procedures. The resultant film properties are summarized in Table I below.

TABLE 1

|  | Example 1 LLDPE* | Example 2 +1% Barex 210** | Example 3 +3% Barex 210 | Example 4 +1% Tyril 1000B*** |
|---|---|---|---|---|
| MD PPT Tear (cm) | 4.96 | 4.38 (12) | 4.68 (6) | 4.53 (9) |
| MD Elmendorf Tear (g/mil) | 151 | 238 (58) | 197 (30) | 192 (27) |
| TEDD (in-lbs/mil) | 21.9 | 23.5 (7) | 28.6 (31) | 23.4 (7) |
| MD Elongation (%) | 432 | 526 (22) | 552 (28) | 502 (16) |
| MD Toughness (ft. lb/in$^3$) | 1088 | 1238 (14) | 1417 (30) | 1199 (16) |
| TD Toughness (ft. lb/in$^3$) | 1037 | 1589 (53) | 1208 (16) | 1321 (27) |

( ) Represents % improvement versus LLDPE control film
*ethylene-1-octene copolymer having a density of 0.922 and a melt index of 0.9
**acrylonitrile-methylacrylate copolymer, melt flow rate 3-12 g/10 min., available from SOHIO
***acrylonitrile-styrene copolymer, melt flow rate 9.5 g/10 min., available from Dow Chemical Co.
PPT = puncture propogation tear
TEDD = total energy dart drop
TD = transverse direction
MD = machine direction The physical properties identified in the Table demonstrate the improvement in LLDPE film strength by adding 1% and 3% acrylonitrile-methylacrylate copolymer and 1% acrylonitrile-styrene copolymer.

Although the present invention has been described with preferred embodiments, it is to be understood that modifications and variations may be resorted to, without departing from the spirit and scope of the invention, as those skilled in the art will readily understand. Such modifications and variations are considered to be within the purview and scope of the appended claims.

What is claimed is:
1. An extrusion blown film comprising:
   (i) from about 90 to about 99 weight percent of a low density linear ethylene copolymer of ethylene and higher olefin; and
   (ii) from about 1 to less than 5 weight percent, of the total composition, of an acrylonitrile homopolymer or copolymer.
2. The film of claim 1 wherein said acrylonitrile copolymer is derived from acrylonitrile and one or more monomers selected from the group consisting of a conjugated diene, a 1-olefin and an acrylic compound having the formula

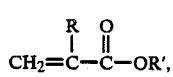

wherein R is selected from the group consisting of hydrogen, methyl and ethyl and R' is alkyl from 1 to about 8 carbon atoms.

3. The film of claim 2 wherein said acrylonitrile copolymer is styrene-acrylonitrile or acrylonitrile-methylacrylate.
4. The film of claim 1 wherein said low density linear ethylene copolymer is a copolymer of ethylene and a higher olefin having 4 to 8 carbon atoms having a density of less than about 0.94.
5. The film of claim 1 wherein said low density linear ethylene copolymer is a copolymer of ethylene and a 1-hexane having a density of less than about 0.94.
6. The film of claim 1 wherein said low density linear ethylene copolymer is a copolymer of ethylene and 1-butene having a density of less than about 0.94.
7. The film of claim 1 wherein said low density linear ethylene copolymer is a copolymer of ethylene and 1-octene having a density of less than about 0.94.
8. A method of improving the physical properties of a extrusion blown film prepared from a low density linear ethylene copolymer of ethylene and higher olefins, said method comprising blending with said low density linear ethylene copolymer of ethylene and higher olefins from about 1 to less than 5 weight percent, based on the total composition, of an acrylonitrile homopolymer or copolymer.
9. The method of claim 8 wherein said acrylonitrile copolymer is derived from acrylonitrile and one or more monomers selected from the group consisting of a conjugated diene, a 1-olefin and an acrylic compound having the formula:

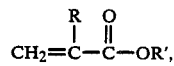

wherein R is selected from the group consisting of hydrogen, methyl and ethyl and R' is alkyl from 1 to about 8 carbon atoms.

10. The film of claim 1 wherein said acrylonitrile copolymer is derived from acrylonitrile and a vinyl monomer.
11. The method of claim 8 wherein said acrylonitrile copolymer is derived from acrylonitrile and a vinyl monomer.

* * * * *